United States Patent [19]

Bersier

[11] Patent Number: 4,966,345
[45] Date of Patent: Oct. 30, 1990

[54] PROP

[75] Inventor: Nicolas Bersier, Bulle, Switzerland

[73] Assignee: Etablissement Nanicoba, Vaduz, Liechtenstein

[21] Appl. No.: 366,980

[22] Filed: Jun. 16, 1989

[30] Foreign Application Priority Data

Jun. 28, 1988 [CH] Switzerland .................. 02446/88

[51] Int. Cl.⁵ .......................................... F16M 13/00
[52] U.S. Cl. .................................. 248/354.3; 254/98
[58] Field of Search ................... 248/161, 405, 406.1, 248/406.2, 354.3, 351, 354.1; 254/98, DIG. 8

[56] References Cited

U.S. PATENT DOCUMENTS

| 2,532,168 | 11/1950 | Jakoubek | 248/354.3 |
| 3,603,552 | 9/1971 | Wheelock | 254/98 |
| 4,234,151 | 11/1980 | John | 248/354.3 |

FOREIGN PATENT DOCUMENTS

| 11205 | 3/1956 | Fed. Rep. of Germany | 248/354.3 |
| 1803627 | 9/1970 | Fed. Rep. of Germany | 248/354.3 |
| 3210448 | 9/1983 | Fed. Rep. of Germany | |
| 1042800 | 11/1953 | France | 248/354.3 |
| 1210274 | 3/1960 | France | |
| 2259213 | 8/1975 | France | 248/354.3 |
| 2492019 | 4/1982 | France | |
| 321018 | 6/1957 | Switzerland | |

Primary Examiner—Ramon O. Ramirez
Assistant Examiner—Robert A. Olson
Attorney, Agent, or Firm—Pollock, Vande Sande & Priddy

[57] ABSTRACT

A prop comprises a central screw (3) and a nut composed of two parts (6a, 6b) disposed in a head (5) turning on the end of the support tube (1). Said two nut parts (6a, 6b) are movable between a position of cooperation with the screw (3) and a position in which it is separated from the screw (3), under the control of arms (12a, 12b). A return spring (16) urges said nut parts (6a, 6b) towards their position of engagement with the screw. The flanks of the thread of the nut parts (6a, 6b) are symmetrical, while the external thread of the screw (3) has asymmetrical flanks, the bottom flank having a slighter slope, thus making it possible for the screw (3) to be pulled by hand into the top position without the nut parts (6a, 6b) preventing this. Safety hooks (9a, 9b) limit the axial movement of the head (5) relative to the tube (1). The large displacements of the screw (3) in both directions can be achieved without the nut having to be turned. Fine adjustment is made with minimum rotation of the head (5). Two safety devices prevent the head (5) from moving out of the tube (1) in the case of one (8, 9) of these devices, and, in the case of the other (16), prevent the screw (3) from moving out of the head (5) and the tube (1), when the prop is inclined with its head downwards.

6 Claims, 2 Drawing Sheets

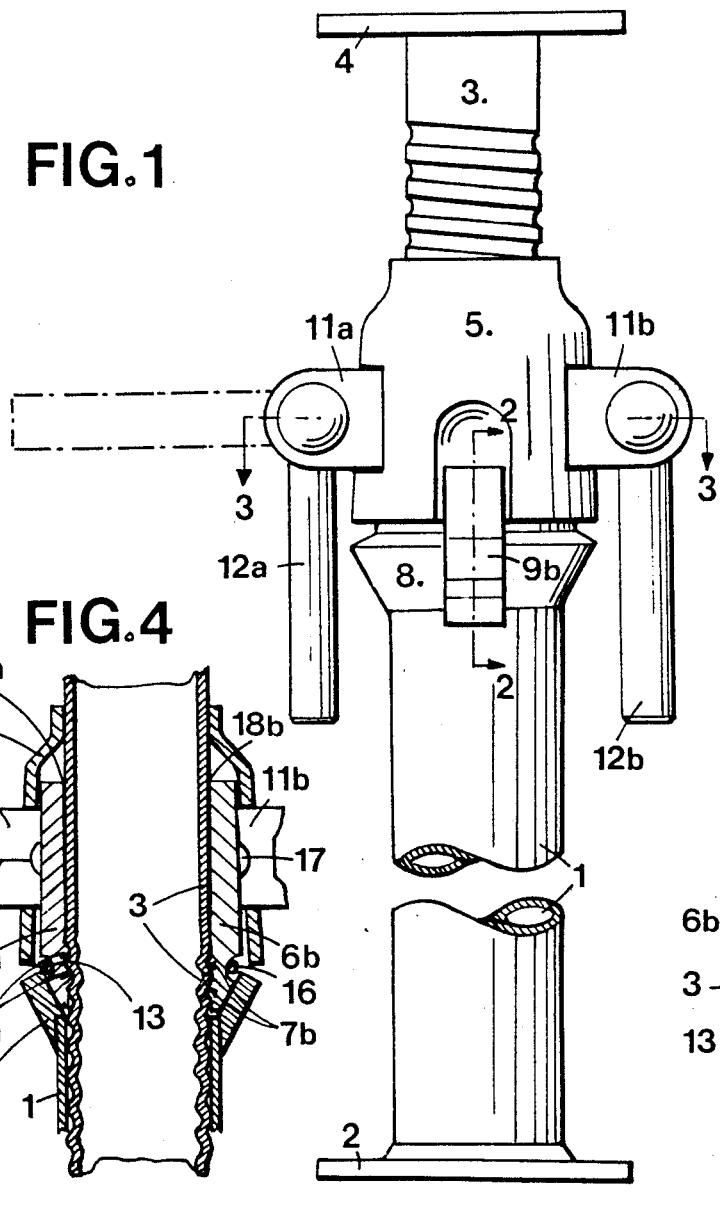
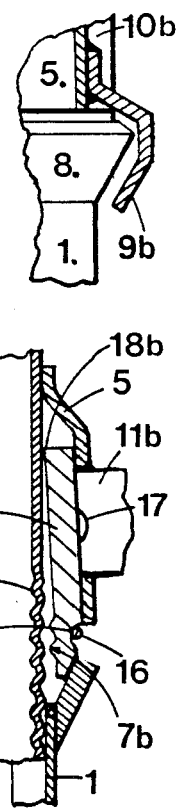
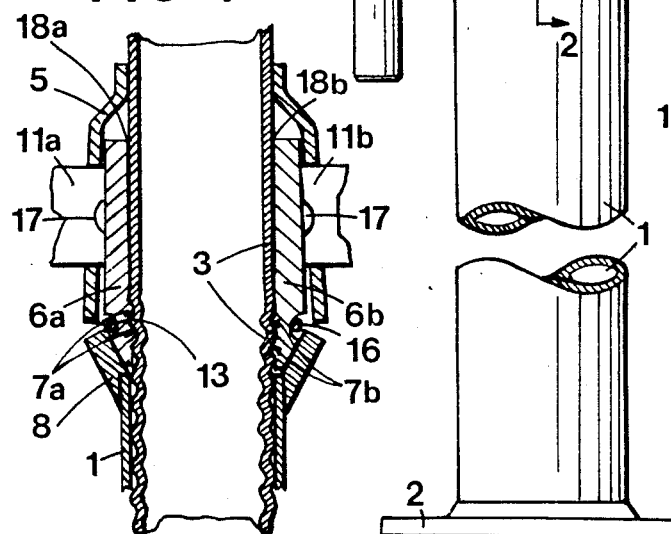
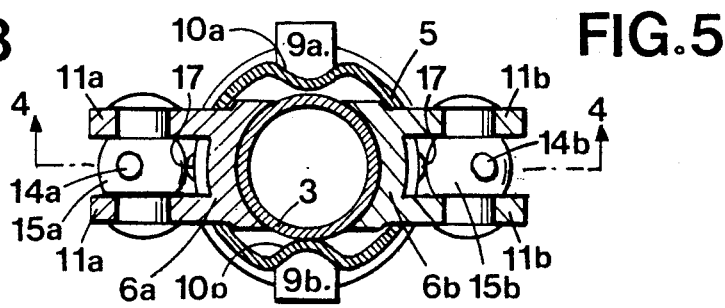

PROP

A prop is known which comprises on the one hand a central screw movable axially in an outer tube forming a support, a head mounted to turn on the end of said tube which is at the top when the prop is in the vertical working position, a nut disposed in said head and composed of two angular nut parts mounted in the head for radial displacement, relative to the screw, between a position of cooperation with the thread of the screw and a position in which it is released from said thread. The patent CH 321,018 describes a prop of this type which is designed to enable the screw to be brought quickly into an approximate working position, the nut being used only for the fine adjustment of the screw. However, in practice, with screw threads of conventional symmetrical shapes it is very difficult and practically impossible to achieve the release of the nut parts from the screw thread and to obtain good support in the working position, precisely because of the symmetrical shape of these screw threads. In addition, no safety system is provided to prevent the inner tube from escaping during manipulation of the prop, so that serious accidents can occur.

The present invention seeks to provide a prop of this kind in which the screw can be rapidly brought, with very moderate effort, into a position close to a working position, while fine adjustment is achieved by turning the nut.

The prop is in addition provided with a double safety system making it impossible for the inner tube to be accidentally removed from the outer tube during manipulation of the prop.

The accompanying drawing illustrates by way of example one form of construction of the prop according to the invention.

FIG. 1 is a view thereof in elevation.

FIG. 2 is a partial view of a detail in section on the line 2—2 in FIG. 1.

FIG. 3 is a view in section on the line 3—3 in FIG. 1.

FIG. 4 is a partial view in section on the line 4—4 in FIG. 3, showing certain parts in the working position of the prop.

FIG. 5 is a similar view to FIG. 4, but shows the same parts in the position of non-cooperation between the nut and the screw.

Figure 7:
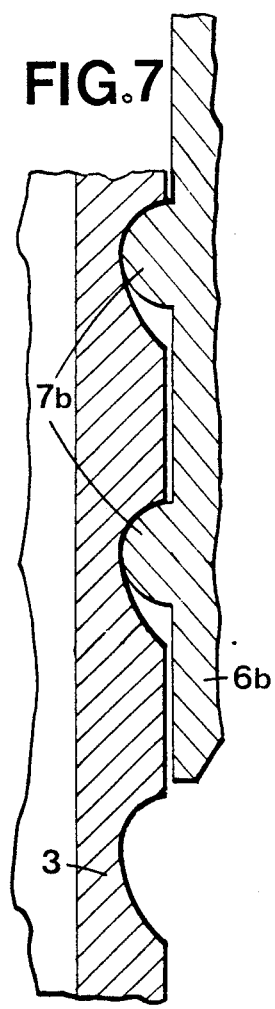
FIG. 7 is a partial view, in section and on a larger scale, of the threads of the screw and of one of the parts of the nut, in the working position of the prop.
Figure 8:
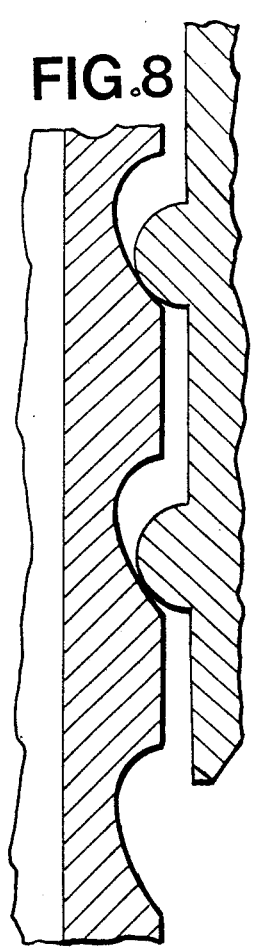

FIG. 8 a similar view to FIG. 7, but shows the threads in an intermediate position in which the nut parts are being separated from the screw or are in the course of resuming their working position.

Figure 9:
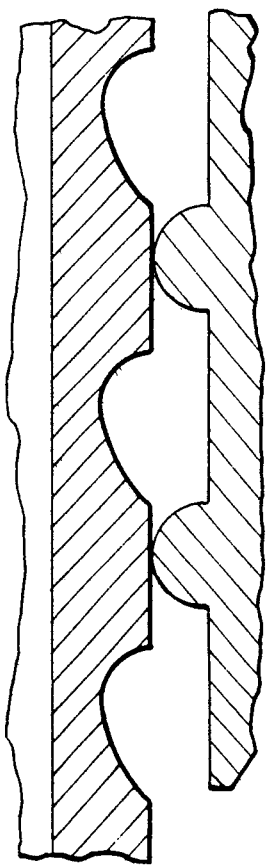

FIG. 9 is a similar view to FIGS. 7 and 8, but shows the thread of one of the nut parts released from the thread of the screw.

The prop shown in the drawing comprises a tube 1 forming a support and provided at one end with a foot 2 intended to rest on the ground. A tubular screw 3 is disposed axially in the tube 1. This screw is provided at its top end with a support plate 4 similar to the foot 2. The bottom end of this screw is without a screw thread over a certain length, in order to prevent the prop from being used beyond its maximum permissible extension. The screw 3 passes through a head 5 arranged to turn on the top end of the tube 1.

Two angular nut parts 6a, 6b are disposed inside the rotating head 5, each extending over an angle smaller than or equal to 180°. Each of these nut parts is of elongate shape and has only a small number (two in the example illustrated) of thread portions 7a, 7b in the region of its bottom end. In FIG. 7 the threads 7b of the nut part 6b can be seen in engagement with the thread of the screw 3.

The tube 1 is provided at the top with an annular widening 8, which serves two purposes. In the first place, its conical interior (FIG. 4) takes the load of the prop and presses the conical bottom end of the nut parts 6a, 6b against the screw 3, thus ensuring the engagement of the thread portions 7a, 7b of the nut parts 6a, 6b in the thread of the screw 3 when the components are in the position shown in FIG. 4.

In the second place, two symmetrical hooks 9a, 9b (FIGS. 2 and 3), welded in symmetrical depressions 10a, 10b in the head 5, come into contact with the widening 8 in order to retain the head 5 on the tube 1 when the prop is transported with its top held inclined downwards.

The depressions 10a, 10b serve to ensure the 1 centering of the head 5 on the screw 3 (FIG. 3).

The nut parts 6a, 6b are each fastened to a respective pair of bearers 11a, 11b passing through holes in the head 5. Arms 12a, 12b are each mounted pivotally on the outer part of one of the pairs of bearers 11a, 11b respectively (FIGS. 1 and 3).

As can be seen in FIGS. 1, 4 and 5, the head 5 is bell-shaped, widening in the downward direction, so that the top end of the nut parts 6a, 6b is situated between the top part of said head and the screw 3 with very slight clearance, whereas towards the bottom the clearance is slightly greater, enabling it to make only a limited oscillation, as is shown by the difference between FIG. 4 and FIG. 5.

In FIG. 4 the head 5 can be seen in its bottom position, in which the conical bottom end of the nut parts 6a, 6b is completely engaged in the inner conical part of the widening 8. This position is automatically assumed through the action of gravity on the bearers 11a, 11b and on the arms 12a, 12b. By pushing the bearers 11a, 11b upwards and acting vertically on the arms 12a, 12b, and because of the downwardly widening shape of the head 5, the nut parts 6a, 6b have oscillated and reached the position shown in FIG. 5, in which the thread parts 7a, 7b are disengaged from the thread of the screw 3. As soon as this disengagement takes place, the screw is no longer held and it falls through the action of gravity to its bottom position, in which the plate 4 substantially lies near the head 5. As soon as the arms 12a, 12b are no longer pushed upwards, the head 5 and the nut parts 6a, 6b return to the position shown in FIG. 4.

In FIGS. 7 to 9 it can be seen that the projecting thread of the nut parts 6a, 6b has two symmetrical flanks, a semicircle in this example. On the other hand, the hollow thread of the screw 3 has two asymmetrical flanks. Its top flank has a shape matching that of the top flank of the thread of the nut parts 6a, 6b (quarter circle), while its bottom flank extends over a greater axial length than its top flank and thus, as can be seen in the drawing, has a mean slope substantially less than that of the top flank. This arrangement has the effect that, when a load acts on the prop, the screw 3 is retained axially (or pushed upwards) by the nut parts 6a, 6b, whereas when the prop is relieved of load, and a sufficient pull is applied manually to the screw 3 in the opposite direction to a load, the threads 7a, 7b of the nut parts 6a, 6b, which then act on the slightly inclined bottom flank of the thread of the screw 3, pushes back the nut parts 6a, 6b towards the outside (FIG. 8) until they are completely released (FIG. 9). The screw can thus be rapidly brought very close to its final working position, and in order to bring the screw into its exact working position it is then only necessary to turn the head 5 (after allowing it to return of its own accord to the bottom position).

In order to avoid any risk that the screw may escape from the nut parts 6a, 6b and from the head 5 (and consequently also from the tube 1) when the prop is transported with its head inclined downwards, the safety means described below is provided.

A groove 13 is formed in the outer bottom portion of the nut parts 6a, 6b, and a split circular wire spring 16 of the circlip type is disposed in said groove in order to urge these nut parts continuously into engagement with the thread of the screw 3. The nut parts 6a, 6b are disconnected from the screw 3 only when this is desired, and to do this it is necessary to operate the bearers 11a, 11b, as already indicated, by raising the head 5 by pushing the arms 12a, 12b upwards. The same result can be obtained with less effort simply by turning the arms 12a, 12b upwards more than 90°, with the aid of the following means.

Figure 6:
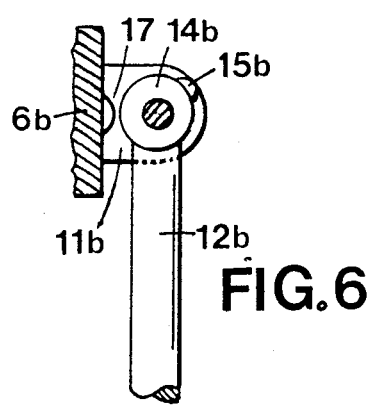
FIG. 6 is a partial view of a detail.

On the head 14a, 14b of the arms 12a, 12b a part 15a, 15b is provided which forms a cam and which comes into contact with a protuberance 17 provided on the outside of the nut parts 6a, 6b in the region of the latter which lies between the bearers 11a and 11b (FIG. 6). When these two cams 15a, 15b encounter the protuberances 17 on the nut parts 6a, 6b, the arms 12a, 12b are fastened to the nut parts 6a, 6b so that, when the arms 12a, 12b are pushed further upwards, it is possible to impart to the bottom portion of the nut parts 6a, 6b a substantially horizontal rocking movement, which brings them into the disengaged position shown in FIG. 5, the points of support being situated at 18a and 18b.

In a variant each of the protuberances 17 shown in FIGS. 4, 5 and 6 and acted on by one of the cam surfaces 15a, 15b, instead of being situated on one of the nut parts 6a, 6b, could be situated on a part of the head 5 extending between a pair of slots provided in said head for the passage of the bearers 11a, 11b.

The prop described offers the following advantages:

The large displacements of the screw 3, in both directions, can be made rapidly without it being necessary to turn the nut.

Fine adjustment is made by very brief rotation of the head 5, in principle a maximum of one revolution and a few degrees.

A safety device (8, 9) automatically prevents the head 5 from accidentally escaping from the support tube 1 when the prop is transported head downwards.

Another safety device (16) automatically prevents the screw from escaping from the head 5 when the prop is transported head downwards.

I claim:

1. A prop comprising a central screw movable axially in an outer tube forming a support, a head mounted to turn on one end of said tube, and a threaded nut composed of two angular nut parts mounted in the head for radial displacement, relative to the screw, between a position in which said nut parts cooperate with the thread of the screw and a position in which said nut parts are released from said thread of the screw, the threads on said nut parts being symmetrical in configuration, the threads on said screw, viewed in axial section and with the prop standing vertically and with said head at the top end of the tube, having a top flank whose shape matches that of the symmetrical thread of each said nut part and a bottom flank which is asymmetrical and extends over a greater axial length than the top flank and has a mean shape less than the top flank so that, when a load acts on the prop, the screw is retained axially in position by engagement of said top flank of the threads of said screw with the threads of said nut parts and said screw can be raised when the head is turned to turn the nut parts in the direction corresponding to said raising, while, when the prop is relieved of load and a sufficient upward pull is applied manually to the screw, the resultant force on the threads of the screw causes the nut parts to move away from and disengage from the central screw to enable the screw to be displaced axially in the nut parts without said nut parts being turned, means being provided to bring said nut parts into the position of disengagement from the screw in order to allow the screw to return to its bottom position through the action of gravity.

2. Prop according to claim 1 including an automatic safety means preventing the separation of the head, together with the screw, from the outer tube when the prop is transported in an inclined position with its head downwards, said means comprising at least one retaining hook permanently fixed on the head and arranged to come into engagement with an external circular projection on the top end of the tube as soon as the head is displaced a predetermined distance relative to the tube.

3. Prop according to claim 1, including a safety device preventing longitudinal displacement of the screw out of the nut parts (1) and of the outer tube (1) when the prop is transported in a downwardly inclined position, said safety device comprising a member retaining said nut parts in engagement with the thread of the screw during such transport of the prop.

4. Prop according to claim 3, wherein said safety device is automatic, the member retaining said nut parts in engagement with the thread of the screw being a split circular spring disposed around said nut parts and urging them resiliently towards their position in which they are in engagement with the screw.

5. Prop according to claim 3 in which said head is provided with two pivoted arms serving on the one hand to turn the head on the tube for the fine adjustment of the screw in a working position or for relieving the prop of load by turning it in the opposite direction, and serving on the other hand to disengage said nut parts from the screw, each arm being mounted pivotally on a pair of bearers fixed respectively to the nut parts and passing through the wall of said head and, said arms being operative to effect disengagement of said nut parts from the thread of the screw by exerting a radial separating force greater than the force applied by said safety device to said nut parts when the head is raised.

6. Prop according to claim 5, wherein each pivoting arm is provided at its pivoting end with a part forming a cam and cooperating with a part of the outer wall of the nut parts when the arms reach a working position other than the position of rest and the position controlling the rotation of the head, in order then to fasten the arms to the nut parts and thereby bring about the separation of said nut parts from the screw.

* * * * *